(12) United States Patent
Mate et al.

(10) Patent No.: US 12,503,831 B2
(45) Date of Patent: Dec. 23, 2025

(54) SEAT CONSOLE ASSEMBLY

(71) Applicant: J. C. Bamford Excavators Limited, Uttoxeter (GB)

(72) Inventors: Dnyaneshwar Mate, Uttoxeter (GB); Carl Denovan, Uttoxeter (GB); Mark Prince, Uttoxeter (GB); Atul Deshmukh, Uttoxeter (GB); Abhijit Hodage, Uttoxeter (GB); Laxminarayan Bhat, Uttoxeter (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 0 days.

(21) Appl. No.: 18/912,569

(22) Filed: Oct. 10, 2024

(65) Prior Publication Data
US 2025/0116091 A1 Apr. 10, 2025

(30) Foreign Application Priority Data
Oct. 10, 2023 (IN) .............................. 202311067742

(51) Int. Cl.
*E02F 9/16* (2006.01)
*E02F 9/20* (2006.01)

(52) U.S. Cl.
CPC .............. *E02F 9/166* (2013.01); *E02F 9/163* (2013.01); *E02F 9/2012* (2013.01)

(58) Field of Classification Search
CPC .......... E02F 9/166; E02F 9/163; E02F 9/2012
See application file for complete search history.

(56) References Cited

U.S. PATENT DOCUMENTS

| 5,860,488 | A | 1/1999 | Kim |
| 10,407,871 | B2 * | 9/2019 | Nishigori ............... B60N 2/646 |

(Continued)

FOREIGN PATENT DOCUMENTS

| JP | H0858415 A | 3/1996 |
| JP | 2005146639 A | 6/2005 |

(Continued)

OTHER PUBLICATIONS

European Search Report, European Patent Application No. 24205619.0, dated Feb. 26, 2025.
Search Report issued in GB2318959.0, dated Jun. 5, 2024.

*Primary Examiner* — Faye M Fleming
(74) *Attorney, Agent, or Firm* — MARSHALL, GERSTEIN & BORUN LLP

(57) ABSTRACT

A seat console assembly for a working machine includes a seat console support; a seat console body movably mounted to the seat console support and movable relative thereto between an operating position and a retracted position; a safety lever movably mounted to the seat console body and movable relative thereto between a blocking position and a non-blocking position for respectively blocking and unblocking an exit passage of the working machine when the seat console body is in the operating position; and a positioning mechanism configured to move the safety lever from the blocking to the non-blocking position in response to the seat console body being moved from the operating to the retracted position. The positioning mechanism is configured such that the safety lever is independently movable with respect to the seat console body from the blocking to the non-blocking position and/or from the non-blocking to the blocking position.

20 Claims, 7 Drawing Sheets

(56) References Cited

U.S. PATENT DOCUMENTS

| | | | | |
|---|---|---|---|---|
| 12,037,053 B2 * | 7/2024 | Yoshida | ................ | A01B 63/111 |
| 12,222,743 B2 * | 2/2025 | Hatta | ........................ | E02F 9/20 |
| 2024/0376692 A1 * | 11/2024 | Masuda | ................ | E02F 9/2004 |

FOREIGN PATENT DOCUMENTS

| | | | |
|---|---|---|---|
| JP | 2007332587 A | 12/2007 | |
| JP | 2008063889 A | 3/2008 | |

* cited by examiner

SEAT CONSOLE ASSEMBLY

FIELD

The present teachings relate to a seat console assembly for a working machine, a cab for a working machine, a working machine, and a method for operating a seat console assembly of a working machine.

BACKGROUND

Working machines, such as excavators, typically include a cab housing a seat and control input members for controlling the working machine. In some working machines, a seat console including at least one of the control input members, such as a joystick, is provided adjacent the seat.

When the seat console is located between the seat and an exit to the cab, there is potential for a problem to arise when the operator moves along an exit passage from the seat to the exit since they may accidentally actuate a control input member of the seat console, which may cause unwanted, and potentially hazardous, control of the working machine (e.g. movement of a dig arm).

To alleviate this problem, it is known to provide seat consoles with a safety lever which is movable between a blocking and a non-blocking position for respectively blocking and unblocking the exit passage, where control input members mounted to the seat console are prevented from controlling the machine when the safety lever is in the non-blocking position. Positioning the safety lever in the blocking position not only indicates to an operator that it is not safe to egress from the cab, but also inhibits their egress by narrowing the exit passage. In some countries, such a safety lever is a legal requirement.

However, even when the safety lever is in the non-blocking position, the seat console may still significantly narrow the exit passage so as to inhibit egress from the cab, especially in smaller cabs. To alleviate this problem, it is known to provide a seat console which can be selectively retracted relative to the seat so as to widen the exit passage. However, this can require an operator to spend a significant amount of time performing multiple operations on such a seat console before they are able to comfortably egress from the cab.

The present teachings seek to overcome or at least mitigate one or more problems associated with the prior art.

SUMMARY

According to a first aspect of the present teachings, there is provided a seat console assembly for a working machine, comprising: a seat console support; a seat console body movably mounted to the seat console support and movable relative thereto between an operating position and a retracted position; a safety lever movably mounted to the seat console body and movable relative thereto between a blocking position and a non-blocking position for respectively blocking and unblocking an exit passage of the working machine when the seat console body is in the operating position; and a positioning mechanism configured to move the safety lever from the blocking to the non-blocking position in response to the seat console body being moved from the operating to the retracted position. The positioning mechanism is configured such that the safety lever is independently movable with respect to the seat console body from the blocking to the non-blocking position and/or from the non-blocking to the blocking position.

Advantageously, an operator of the working machine wishing to egress therefrom can unblock the exit passage of the working machine via a single operation, i.e. moving the seat console body to the retracted position, allowing them to egress easily and rapidly. Moreover, since the safety lever is independently movable with respect to the seat console body, an operator has greater flexibility for how they can configure the seat console assembly.

The positioning mechanism may comprise a linkage configured to move the safety lever from the blocking to the non-blocking position in response to the seat console body being moved from the operating to the retracted position.

Advantageously, the linkage enables the safety lever to be moved from the blocking to the non-blocking position in a consistent and robust fashion, without requiring electrical power.

The linkage may be configured to inhibit the safety lever moving from the non-blocking to the blocking position when the seat console body is in the retracted position.

Advantageously, such a configuration may help to improve the safety of an operator when exiting from the working machine.

The linkage may be configured such that the safety lever is independently movable with respect to the seat console body from the blocking to the non-blocking position and/or from the non-blocking to the blocking position.

The linkage may comprise a first portion and a second portion. The second portion may drive the first portion in response to the seat console body being moved from the operating to the retracted position to move the safety lever from the blocking to the non-blocking position. The first portion may be independently movable with respect to the second portion such that the safety lever is independently moveable with respect to the seat console body from the blocking to the non-blocking position and/or from the non-blocking to the blocking position.

The first portion may be inhibited from moving relative to the second portion when the seat console body is in the retracted position, so as to inhibit the safety lever moving from the non-blocking to the blocking position.

The first portion may comprise a first link pivotally connected to the safety lever at a first pivot point. The second portion may be pivotally connected to the first portion at a second pivot point. The first or second portion may be configured such that the second pivot point is movable relative thereto. The second pivot point may move relative to said first or second portion when the safety lever is moved from the blocking to the non-blocking position and/or from the non-blocking to the blocking position, to allow the first portion to move independently of the second portion.

The first or second portion may comprise a track along which the second pivot point is movable.

The first portion may comprise a first link pivotally connected to the safety lever at a first pivot point. The second portion may be pivotally connected to the first portion at a second pivot point. The second portion may comprise a second link pivotally connected to the first portion (e.g. the first link) at the second pivot point and to the seat console body at a third pivot point. The second link may pivot about the third pivot point so as to drive the first portion in response to the seat console body being moved from the operating to the retracted position, so as to move the safety lever from the blocking to the non-blocking position.

The positioning mechanism may be configured to inhibit the safety lever moving from the non-blocking to the blocking position when the seat console body is in the retracted position.

Advantageously, such a configuration may help to improve the safety of an operator when exiting from the working machine.

The positioning mechanism may comprise a bell crank pivotally mounted to the seat console body. The positioning mechanism may be configured such that the bell crank pivots relative to the seat console body in response to the seat console body being moved from the operating to the retracted position. Said pivoting of the bell crank may drive the safety lever to move from the blocking to the non-blocking position.

The bell crank may be arranged so as to inhibit the safety lever moving from the non-blocking to the blocking position when the seat console body is in the retracted position.

Advantageously, such a configuration may help to improve the safety of an operator when exiting from the working machine.

The seat console assembly may further comprise: a control input member, such as a joystick, for controlling the working machine. The control input member may be mounted to the seat console body. The seat console assembly may further comprise an isolation system configured to isolate the control input member when the safety lever is in the non-blocking position so as to prevent the control input member from controlling the working machine.

Advantageously, the isolation system helps to prevent inadvertent operations of the control input member from controlling the working machine when the safety lever is in the non-blocking position, improving safety when an operator exits the working machine.

The isolation system may comprise a sensor configured to determine a relative angular displacement between the safety lever and the seat console body. The isolation system may be configured to isolate the control input member when an output of the sensor indicates that the safety lever is in the non-blocking position.

Advantageously, such a configuration of the isolation system may help prevent inadvertent operations of the control input member from controlling the working machine when the safety lever is in the non-blocking position regardless of the position of the seat console body.

The seat console assembly may further comprise a safety lever biasing mechanism configured to bias the safety lever towards the blocking and/or non-blocking positions.

Advantageously, the safety lever biasing mechanism helps ensure that the safety lever is in the blocking or non-blocking position when stationary, which may make it clearer to an operator as to whether it is safe to egress from the working machine.

The safety lever biasing mechanism may comprise a biasing device, such as a spring (e.g. a gas spring), connecting the safety lever and the seat console body.

The seat console assembly may further comprise a seat console body biasing mechanism may be configured to bias the seat console body towards the retracted position.

Advantageously, the seat console body biasing mechanism may reduce the effort needed by an operator to move the seat console body from the operating to the retracted position.

The seat console body biasing mechanism may comprise a biasing means, such as a spring (e.g. a gas spring), connecting the seat console body and the seat console support.

The seat console assembly may further comprise a latching mechanism configured to selectively latch the seat console body to the seat console support when the seat console body is in the operating position.

The seat console assembly may further comprise a release lever. The latching mechanism may be operated via the release lever to unlatch the seat console body from the seat console support. The release lever may protrude from an upper surface of the seat console body.

Advantageously, such a configuration of the latching mechanism may enable an operator to move the seat console body from the operating to the retracted position in a more ergonomic fashion.

The operating and retracted positions may be respective lowered and raised positions of the seat console body relative to the seat console support.

The seat console body may be pivotable relative to the seat console support between the operating and retracted positions.

A pivot angle of the seat console body in the retracted position relative to the operating position may be in the range of 20 to 40 degrees; optionally 25 to 35 degrees, e.g. approximately 30 degrees.

The safety lever may be pivotable relative to the seat console body between the blocking and non-blocking positions.

According to a second aspect of the present teachings, there is provided an operator station for a working machine, comprising: a seat; a seat console assembly according to the first aspect of the present teachings; and an exit passage along which an operator in the seat can egress from the operator station. In the blocking position, the safety lever blocks the exit passage. In the non-blocking position, the safety lever unblocks the exit passage.

The operator station may be a cab.

According to a third aspect of the present teachings, there is provided a working machine comprising a seat console assembly according to the first aspect of the present teachings or an operator station according to the second aspect of the present teachings.

According to a fourth aspect of the present teachings, there is provided a method for operating a seat console assembly of a working machine, the seat console assembly comprising: a seat console support; a seat console body movably mounted to the seat console support and movable relative thereto between an operating position and a retracted position; a safety lever movably mounted to the seat console body and movable relative thereto between a blocking position and a non-blocking position for respectively blocking and unblocking an exit passage of the working machine when the seat console body is in the operating position; and a positioning mechanism. The method comprises: positioning the seat console body in the operating position and the safety lever in the blocking position; and moving the seat console body from the operating to the retracted position, causing the positioning mechanism to move the safety lever from the blocking to the non-blocking position in response. The positioning mechanism is configured such that the safety lever is independently movable with respect to the seat console body from the blocking to the non-blocking position and/or from the non-blocking to the blocking position.

The seat console assembly may comprise a control input member, such as a joystick, configured to control the working machine. The control input member may be mounted to the seat console body. The method may further comprise: controlling the working machine via the control input member when the safety lever is in the blocking position; and preventing the control input member from controlling the working machine when the safety lever is in the non-blocking position.

BRIEF DESCRIPTION OF THE DRAWINGS

Embodiments are now disclosed by way of example only with reference to the drawings, in which.

DETAILED DESCRIPTION OF EMBODIMENT(S)

In the following detailed description, numerous specific details are set forth in order to provide a thorough understanding of various embodiments and the inventive concept. However, those skilled in the art will understand that: the present invention may be practiced without these specific details or with known equivalents of these specific details; that the present invention is not limited to the described embodiments; and, that the present invention may be practiced in a variety of alternative embodiments. It will also be appreciated that well known methods, procedures, components, and systems may not have been described in detail.

Figure 1:
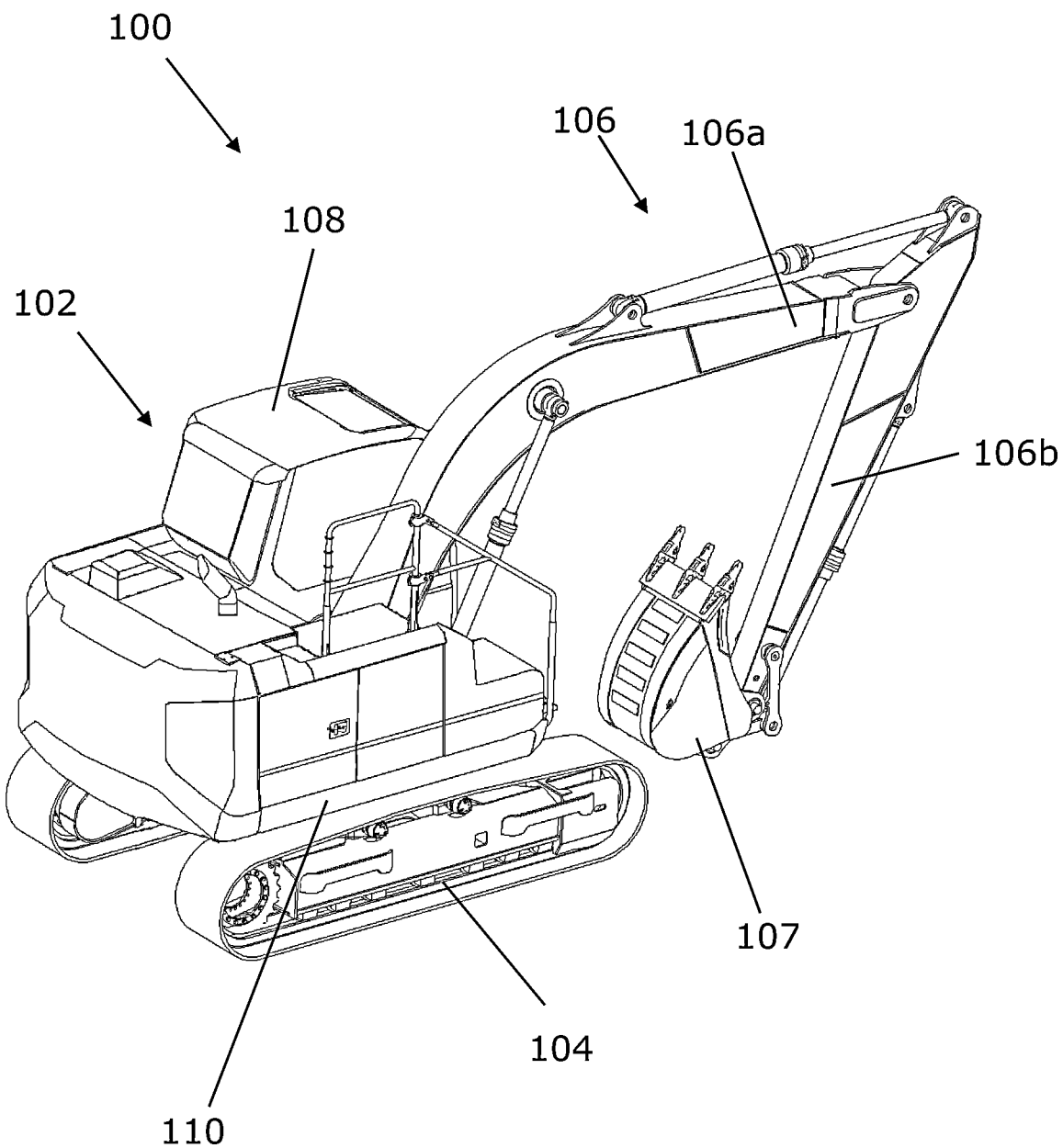
FIG. 1 is an isometric view of a working machine according to an embodiment of the present teachings.

FIG. 1 shows a side view of a working machine 100. The working machine 100 may be suitable for use in off-highway applications such as construction or agriculture. In the present embodiment, the working machine 100 is a slewing excavator. Alternatively, the working machine 100 could be any type of working machine such as a loader, a telescopic handler, a backhoe loader, a forklift, a dumper, a tractor, or a mobile crane for example, where access to an operator's seat may be restricted by a seat console or armrest which incorporates a control input member. Such working machines may be denoted as off-highway vehicles.

The working machine 100 includes a superstructure 102 and a ground-engaging structure 104. The superstructure 102 is mounted upon the ground-engaging structure 104.

In FIG. 1, the ground-engaging structure 104 includes a pair of continuous tracks. However, it will be appreciated that the ground-engaging structure 104 could alternatively include, for example, a plurality of wheels.

In the illustrated embodiment, the superstructure 102 is movable relative to the ground-engaging structure 104. The superstructure 102 is capable of rotating with respect to the ground-engaging structure 104 about an axis that is substantially vertical in FIG. 1. In some embodiments, the superstructure 102 may be capable of pivoting through 360 degrees relative to the ground-engaging structure 104. Alternatively, the superstructure 102 may have a substantially fixed relationship with respect to the ground-engaging structure 104.

The working machine 100 includes a working arm 106. The working arm 106 is connected to the superstructure 102 and is provided for performing working operations (e.g. excavating, loading or unloading). In the illustrated embodiment, the working arm 106 includes a boom 106a pivotally mounted to the superstructure 102, and a dipper arm (stick) 106b pivotally mounted to the boom 106a. A bucket 107, is pivotally mounted to a distal end of the dipper arm 106b. In alternative embodiments, any attachment may instead be mounted to the distal end of the dipper arm 106b.

The superstructure 102 includes an operator station in the form of a cab 108 and a chassis 110. The chassis 110 provides a base for the cab 108. In the illustrated embodiment, the cab 108 is directly mounted to the chassis 110. However, in other embodiments, another structure may be partially or wholly interposed between the cab 108 and the chassis 110. The cab 108 is intended to house a human operator of the working machine 100. In alternative embodiments the cab 108 may be replaced by an operator station that does not fully enclose an operator, such as a safety frame or canopy (not shown).

Figure 2:
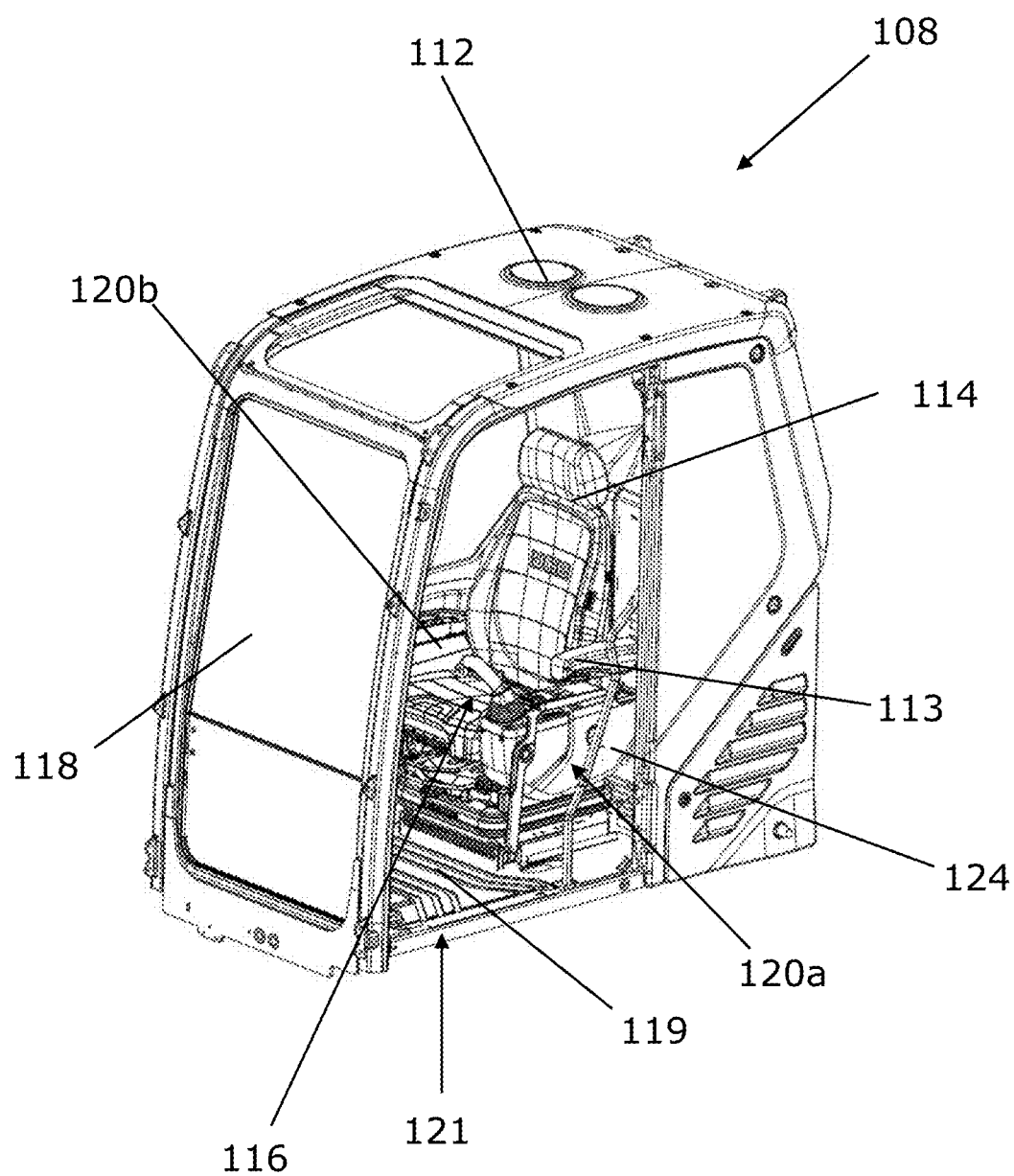
FIG. 2 is an isolated isometric view of a cab of the working machine of FIG. 1.

FIG. 2 shows an isolated isometric view of the cab 108. The cab 108 includes a housing structure 112, a seat 114 for an operator, and a plurality of control input members 116 for controlling the working machine 100 (e.g. for controlling the ground-engaging structure 104, pivoting of the superstructure 102 relative to the ground-engaging structure 104 (i.e. slewing), and/or the working arm 106). The seat 114 and the control input members are housed within the housing structure 112. The seat 114 is arranged such that the seat 114 and an operator seated in the seat 114 face a front screen 118 of the cab 108.

The cab 108 includes an exit passage 119 along which an operator seated in the seat 114 can egress from the cab 108. In the illustrated embodiment, the exit passage 119 extends between the seat 114 and an exit/entrance 121 of the cab 108 located on a left side of the housing structure 112. The exit/entrance 121 may be selectively closable by a door (not shown) of the cab 108. Here "left" and "right" directions are with reference to an operator (not shown) seated in the seat 114 and facing the front screen 118.

Figure 3:
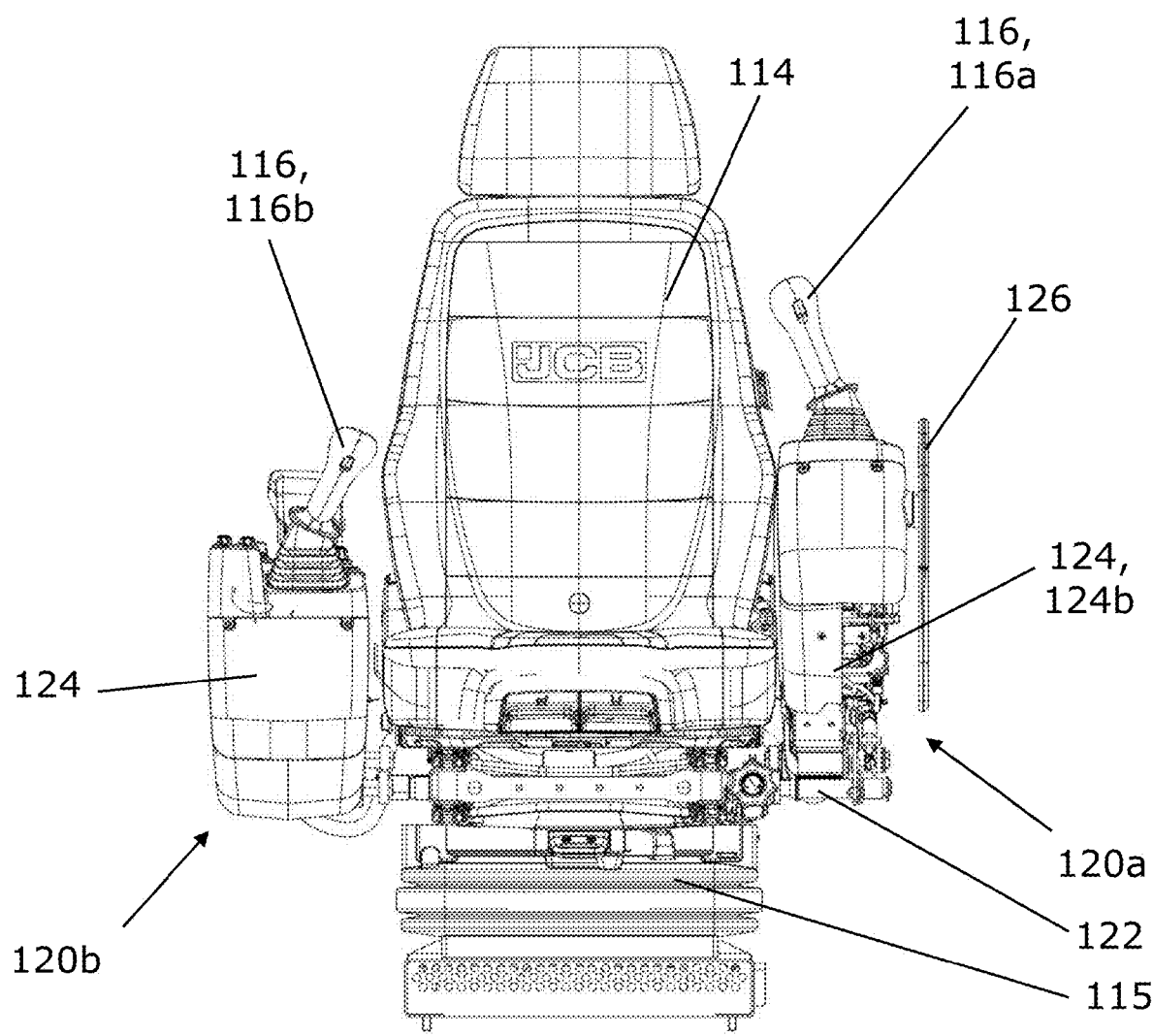
FIG. 3 is an isolated front view of the cab of FIG. 2.

With further reference to FIG. 3, the cab 108 includes a first seat console assembly 120a, and a second seat console assembly 120b. The first and second seat console assemblies 120a, 120b are located on the left-hand-side and right-hand-side of the seat 114 respectively. The first seat console assembly 120a is interposed between the seat 114 and the exit/entrance 121, such that the first seat console assembly 120a partially defines the exit passage 119.

In alternative embodiments (not shown), the first and second seat console assemblies 120a, 120b may instead be located on the right-hand-side and left-hand-side of the seat 114 respectively. In such embodiments, the exit/entrance 121 may be on a right side of the housing structure 112, and the first seat console assembly 120a may be interposed between the seat 114 and said exit/entrance 121.

Figure 4:
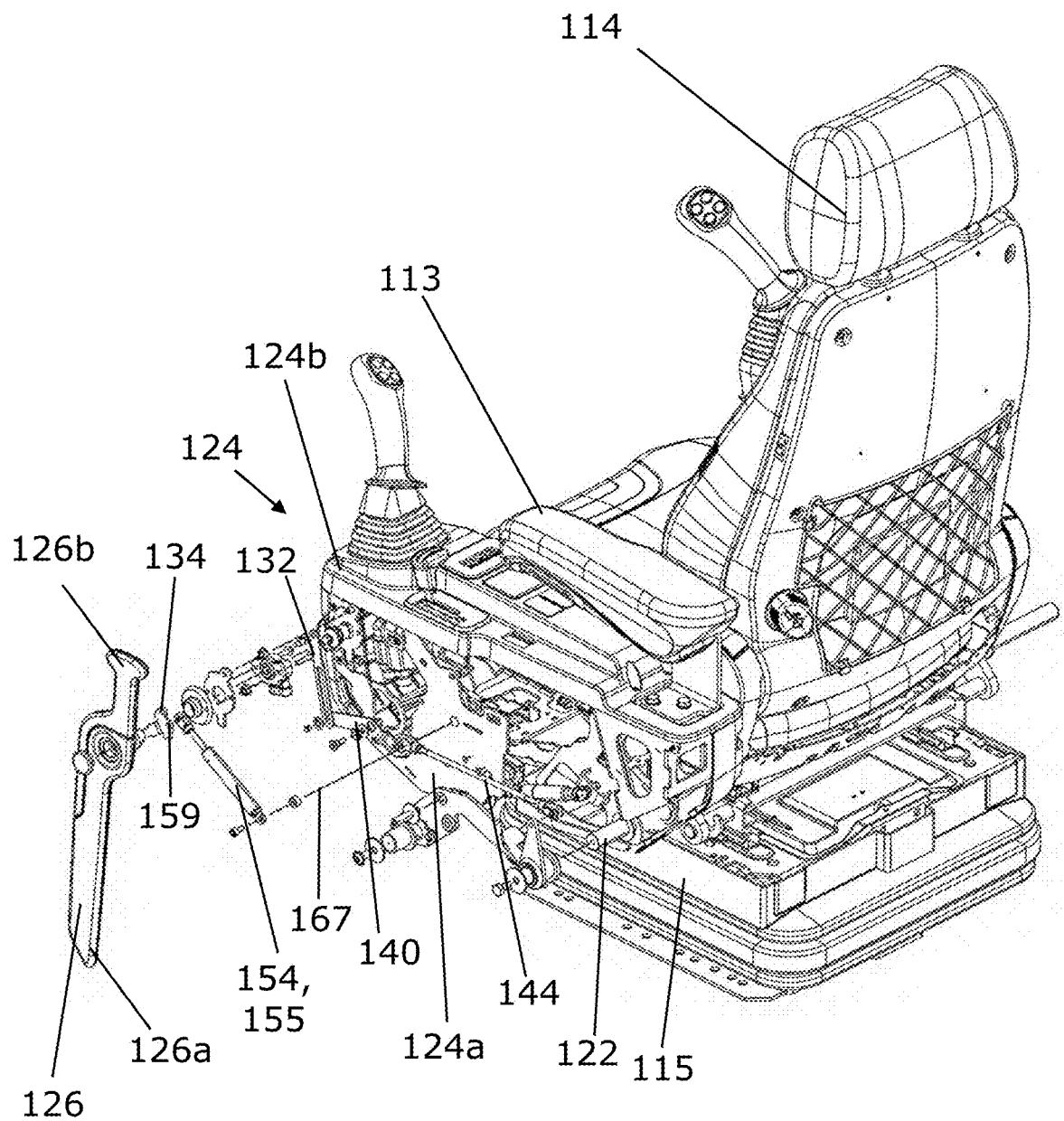
FIG. 4 is a partially exploded view of a seat console assembly of the cab of FIG. 2.

Each seat console assembly 120a, 120b includes a seat console body 124, and at least one control input member 116 mounted to the seat console body 124. With further reference to FIG. 4, each seat console body 124 includes a supporting structure 124a (e.g. formed from metal) encased in a shell 124b (e.g. formed from plastics). An upper surface of the shell 124b may function as an armrest for the operator. In the illustrated embodiment, the seat 114 includes a separate pair of armrests 113 above the console which the operator may also choose to rest their arms on.

In the illustrated embodiment, the plurality of control input members 116 inside the cab 108 includes a first joystick 116a mounted to the seat console body 124 of the first seat console assembly 120a, and a second joystick 116b mounted to the seat console body 124 of the second seat console assembly 120b.

In alternative embodiments (not shown), alternative or additional control input members 116 may be mounted to the seat console body 124 of the first and/or second seat console assembly 120a, 120b.

In the illustrated embodiment, the first and second joysticks 116a, 116b control pivoting of the superstructure 102 relative to the ground-engaging structure 104 (i.e. slewing), pivoting of the boom 106a relative to the superstructure 102, pivoting of the dipper arm 106b relative to the boom 106a, and pivoting of a mounted attachment (not shown), such as a bucket, relative to the dipper arm 106b. The working machine 100 may be configured such that the first and second joysticks 116a, 116b implement ISO or SEA control patterns.

With further reference to FIGS. 4 to 7, the first seat console assembly 120a includes a seat console support 122. The seat console body 124 is movably mounted to the seat console support 122. The seat console body 124 is movable relative to the seat console support 122 between an operating position (shown in FIGS. 2, 4, 5 and 7) and a retracted position (shown in FIGS. 3 and 6). In the operating position, the first joystick 116a is ergonomically operable by the left hand of an operator seated in the seat 114. In the retracted position, the first joystick 116a may be more difficult and/or less ergonomic to operate by an operator seated in the seat 114 relative to when the first seat console assembly 120a is in the operating position. The exit passage 119 is wider when the seat console body 124 is in the retracted position relative to the operating position.

In the illustrated embodiment, the operating and retracted positions are respectively lowered and raised positions of the seat console body 124 relative to the seat console support 122.

In the illustrated embodiment, the seat console body 124 is pivotable relative to the seat console support 122 between the operating and retracted positions. For example, a pivot angle of the seat console body 124 in the retracted position relative to the operating position may be in the range of 20 to 40 degrees; optionally 25 to 35 degrees, e.g. approximately 30 degrees. In alternative embodiments (not shown), the seat console body 124 may additionally or alternatively translate relative to the seat console support 122 between the operating and retracted positions.

In the illustrated embodiment, the seat 114 is supported by a seat base 115 secured to a floor of the housing structure 112, and the seat console support 122 is secured to the seat base 115 (see FIGS. 3 and 4). In alternative embodiments (not shown), the seat console support 122 may be fixed to the housing structure 112, directly or via any suitable structure.

The first seat console assembly 120a includes a safety lever 126 movably mounted to the seat console body 124. The safety lever 126 is movable relative to the seat console body 124 between a blocking position (shown in FIG. 5) and a non-blocking position (shown in FIGS. 2, 4, 6 and 7) for respectively blocking and unblocking the exit passage 119 of the cab 108 when the seat console body 124 is in the operating position.

In the illustrated embodiment, the safety lever 126 is pivotable relative to the seat console body 124 between the blocking and non-blocking positions. In alternative embodiments (not shown), the safety lever 126 may additionally or alternatively translate relative to the seat console body 124 between the blocking and non-blocking positions.

Figure 5:
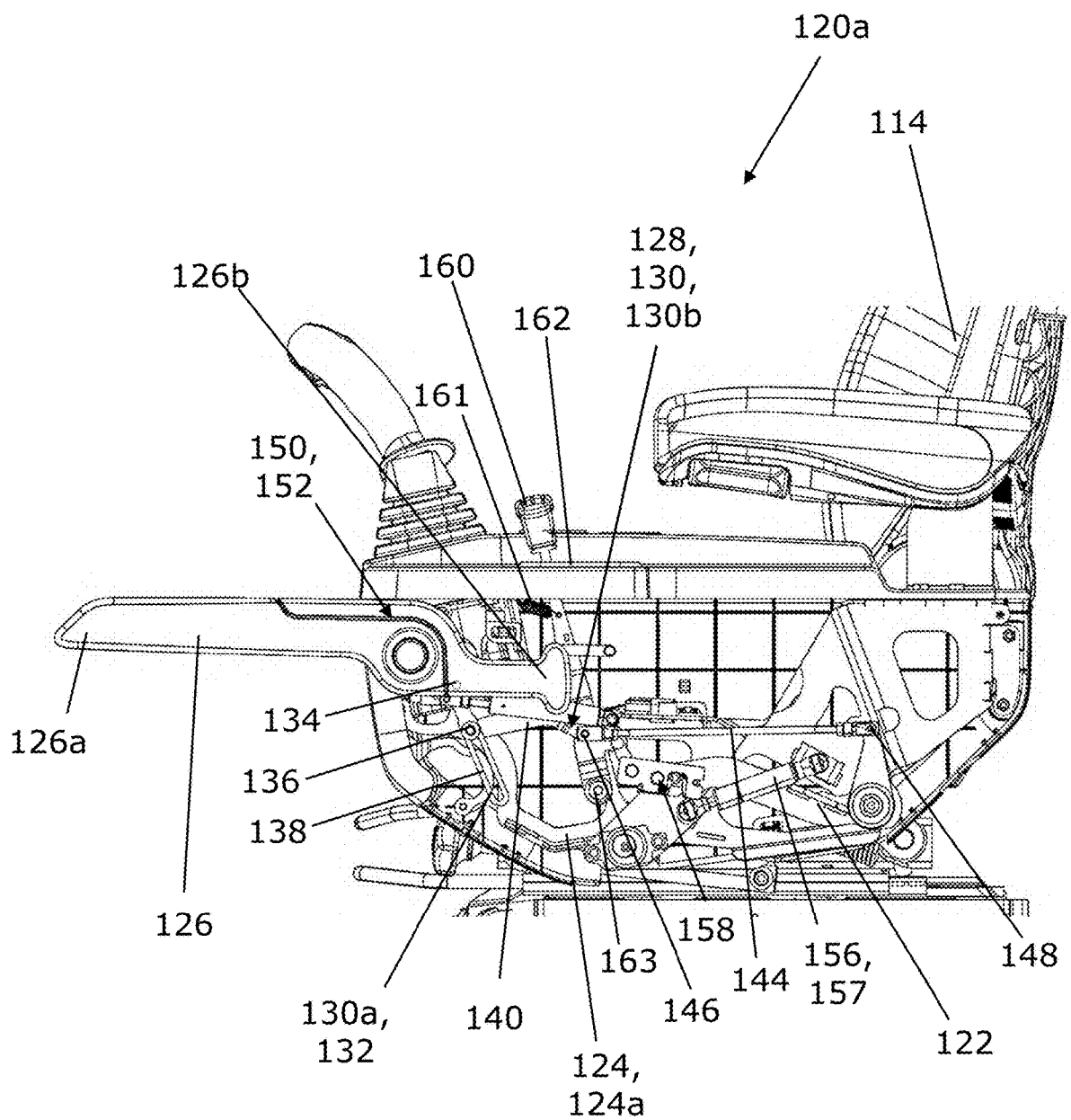
FIG. 5 is a side view of the seat console assembly of FIG. 4 in a first configuration.
Figure 6:
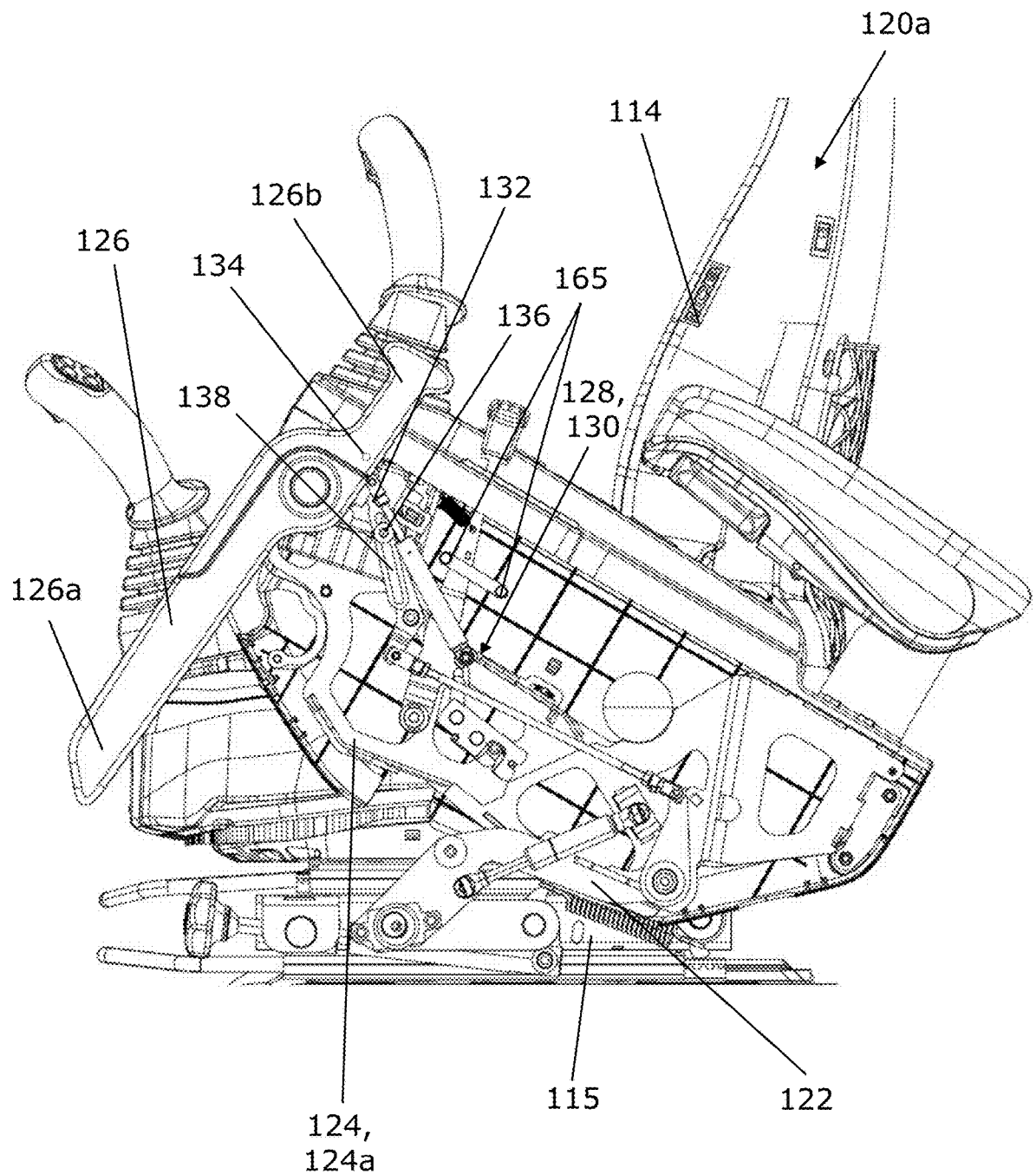
FIG. 6 is a side view of a seat console assembly of FIG. 4 in a second configuration.

The first seat console assembly 120a includes a positioning mechanism 128 configured to move the safety lever 126 from the blocking to the non-blocking position in response to the seat console body 124 being moved from the operating to the retracted position. For example, as shown in FIGS. 5 and 6, in response to the seat console body 124 being moved from the operating position (FIG. 5) to the retracted position (FIG. 6), the positioning mechanism 128 automatically moves the safety lever 126 from the blocking to the non-blocking position. Advantageously, the positioning mechanism 128 enables an operator of the working machine 100 wishing to egress from the cab 108 to unblock and widen the exit passage 119 via a single operation, i.e. moving the seat console body 124 to the retracted position, allowing them to egress easily and rapidly. The safety lever 126 has a first lever end 126a and a second lever end 126b.

In the illustrated embodiment, the positioning mechanism 128 is configured such that the safety lever 126 is independently movable with respect to the seat console body 124 from the blocking to the non-blocking position, and from the non-blocking to the blocking position, when the seat console body 124 is in the operating position. By 'independently movable', it is intended to mean that that the safety lever 126 is able to move relative to the seat console body 124 when the seat console body 124 is stationary with respect to the seat console support 122. Advantageously, this provides an operator with greater flexibility for how they can configure the first seat console assembly 120a.

In the illustrated embodiment, the positioning mechanism 128 is configured such that the safety lever 126 is inhibited from moving from the non-blocking to the blocking position when the seat console body 124 is in the retracted position. As will be discussed more below, in the illustrated embodiment, the control input member 116a mounted to the seat console body 124 is isolated when the safety lever 126 is in the non-blocking position so as to prevent the control input member 116a from controlling the working machine 100. As such, retaining the safety lever 126 in the non-blocking position when the seat console body 124 is in the retracted position helps to prevent an operator from inadvertently controlling the working machine 100 via the control input member 116a when exiting the cab 108. Moreover, the risk of an operator tripping over the safety lever 126 when exiting the cab 108 is reduced.

Figure 7:
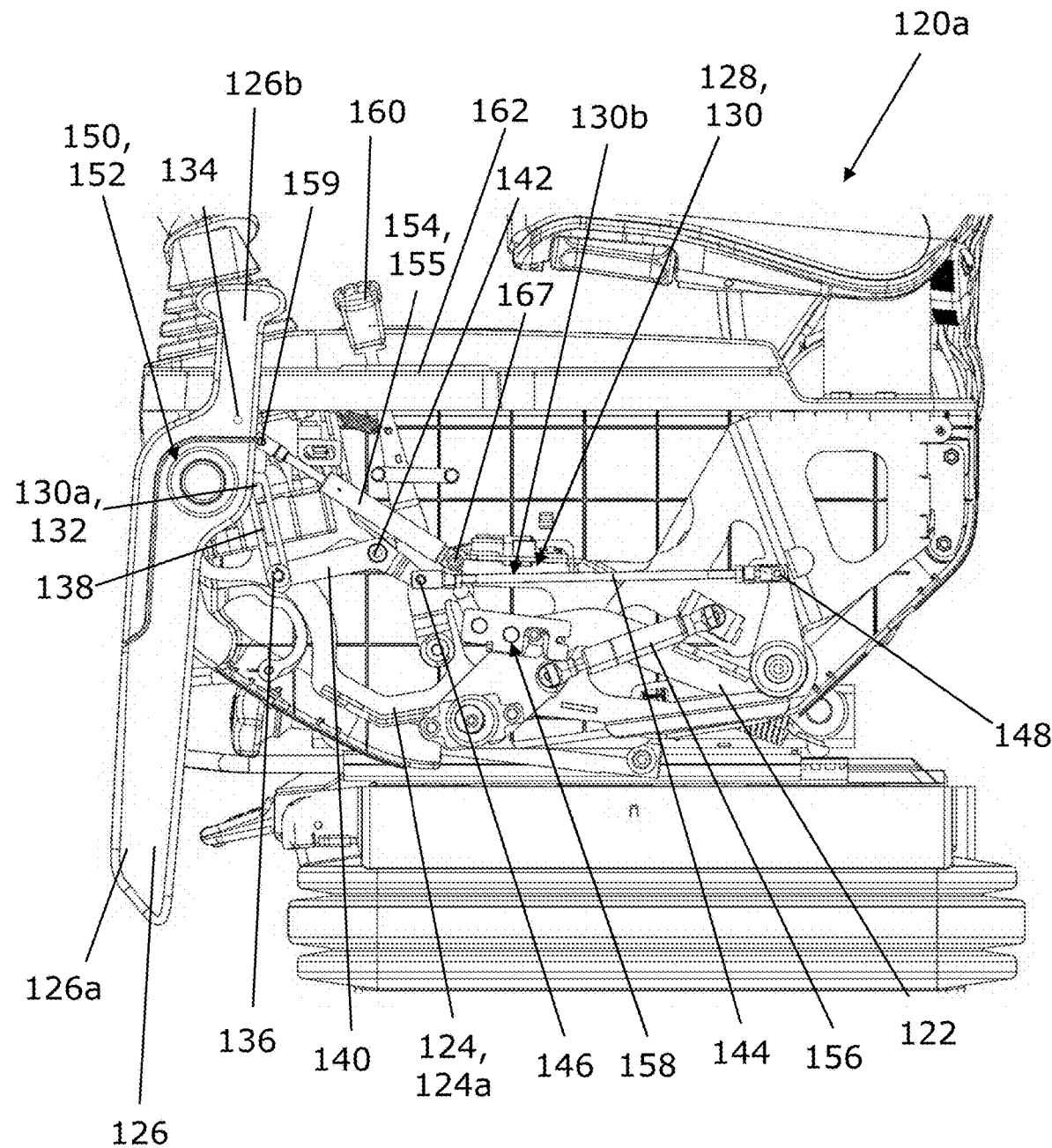
FIG. 7 is a side view of a seat console assembly of FIG. 4 in a third configuration.

In the illustrated embodiment, the first seat console assembly 120a may have any of the following configurations: i) the safety lever 126 in the blocking position, and the seat console body 124 in the operating position (FIG. 5); ii) the safety lever 126 in the non-blocking position, and the seat console body 124 in the retracted position (FIG. 6); and iii) the safety lever 126 in the non-blocking position, and the seat console body 124 in the operating position (FIG. 7).

In alternative embodiments (not shown), the safety lever 126 may not be independently movable with respect to the seat console body 124 from the blocking to the non-blocking position, or from the non-blocking to the blocking position, when the seat console body 124 is in the operating position.

In alternative embodiments (not shown), the safety lever 126 may be independently movable with respect to the seat console body 124 from the non-blocking to the blocking position when the seat console body 124 is in the retracted position. In such embodiments, the safety lever 126 may also be independently movable with respect to the seat console body 124 from the blocking to the non-blocking position.

In the illustrated embodiment, the positioning mechanism 128 includes a linkage 130 configured to move the safety lever 126 from the blocking to the non-blocking position in response to the seat console body 124 being moved from the operating to the retracted position. In alternative embodiments (not shown), the positioning mechanism 128 may include any suitable arrangement configured to move the safety lever 126 from the blocking to the non-blocking position in response to the seat console body 124 being moved from the operating to the retracted position. For example, the positioning mechanism may additionally or alternatively include a gear arrangement, and/or an electronic actuator arrangement.

The linkage 130 includes a first portion 130a and a second portion 130b. The second portion 130b drives the first portion 130a in response to the seat console body 124 being moved from the operating to the retracted position to move the safety lever 126 from the blocking to the non-blocking position. The first portion 130a is independently movable with respect to the second portion 130b such that the safety lever 126 is independently moveable with respect to the seat console body 124.

The first portion 130a includes a first link 132 pivotally connected to the safety lever 126 at a first pivot point 134. The first pivot point 134 is shown in FIG. 4, and is represented by a dashed circle in FIGS. 5 to 7. The first pivot point 134 is fixed relative to the first link 132 and the safety lever 126.

The second portion 130b is pivotally connected to the first portion 130a (i.e. the first link 132 in the illustrated embodiment) at a second pivot point 136. The second pivot point 136 is movable relative to the first portion 130a. In the illustrated embodiment, the first link 132 includes a track 138 along which the second pivot point 136 is linearly movable as well as being pivotable (i.e. as a pin and slot connection).

As shown by comparing FIGS. 5 and 7, when the seat console body 124 is in the operating position, the second pivot point 136 moves along the track 138 when the safety lever 126 is moved independently of the seat console body 124 to allow the first portion 130a to move independently of the second portion 130b. As such, the safety lever 126 is independently movable with respect to the seat console body 124 from the blocking to the non-blocking position and from the non-blocking to the blocking position when the seat console body 124 is in the operating position.

In the illustrated embodiment, the first link 132 includes the track 138. In alternative embodiments (not shown), the first portion 130a may include one or more further links, and one of said one or more further links may include the track 138. Alternatively, the second portion 130b may include the track 138. Alternatively, the second pivot point 136 may be movable relative to the first portion 130a or the second portion 130b via any suitable means.

The second portion 130b includes a second link 140 pivotally connected to the first portion 130a (i.e. the first link 132 in the illustrated embodiment) at the second pivot point 136. The second pivot point 136 is fixed relative to the second link 140. The second link 140 is pivotally connected to the seat console body 124 at a third pivot point 142. The third pivot point 142 is fixed relative to the second link 140 and the seat console body 124. The linkage 130 is configured such that the second link 140 pivots about the third pivot point 142 so as to drive the first portion 130a in response to the seat console body 124 being moved from the operating to the retracted position.

The second portion 130b includes a third link 144 pivotally connected to the second link 140 at a fourth pivot point 146. The fourth pivot point 146 is fixed relative to the second link 140 and the third link 144. The third link 144 is pivotally connected to the seat console support 122 at a fifth pivot point 148. The fifth pivot point 148 is fixed relative to the third link 144 and the seat console support 122. In response to the seat console body 124 being moved from the operating to the retracted position, the third link 144 drives the second link 140, such that the second link 140 pivots about the third pivot point 142 (clockwise in FIGS. 5 to 7). Such pivoting of the second link 140 about the third pivot point 142 drives the first link 132 to move the safety lever 126 relative to the seat console body 124 from the blocking to the non-blocking position. As such, the second link 140 is a bell crank.

When the seat console body 124 is in the retracted position and the safety lever 126 is in the non-blocking position, as shown in FIG. 6, movement of the seat console body 124 to the operating position causes the second pivot point 136 to move along the track 138 such that the safety lever 126 remains in the non-blocking position, as shown in FIG. 7. Likewise, when the seat console body 124 is subsequently moved to the retracted position, the second pivot point 136 moves along the track 138 such that the safety lever 126 remains in the non-blocking position, as shown in FIG. 6. In alternative embodiments (not shown), the linkage 130 may have any suitable configuration.

When the seat console body 124 is in the retracted position and the safety lever 126 is in the non-blocking position, as shown in FIG. 6, the linkage 130 is configured to inhibit the safety lever 126 moving to the blocking position. In the illustrated embodiment, attempted movement of the safety lever 126 from the non-blocking to the blocking position (i.e. clockwise rotation of the safety lever 126 in FIG. 6) causes the second pivot point 136 to abut against the end of the track 138 closest to the first pivot point 134, which causes the first link 132 to exert a torque on the second link 140 about the third pivot point 142 (anticlockwise in FIG. 6). The second link 140 is inhibited from rotating about the third pivot point 142 by the third link 144. As such, the safety lever 126 is inhibited from moving to the blocking position. In FIG. 6, the second pivot point 136 is spaced from the end of the track 138 closest to the first pivot point 134, and so the safety lever 126 is able to move slightly away from the non-blocking position. However, the second pivot point 136 abuts against said end of the track 138 before the safety lever 126 reaches the blocking position. In alternative embodiments (not shown), the positioning mechanism 128 may have any suitable configuration for inhibiting the safety lever 126 moving from the non-blocking to the blocking position when the seat console body 124 is in the retracted position.

The first seat console assembly 120a includes a safety lever biasing mechanism 154 configured to bias the safety lever 126 towards the blocking and non-blocking positions; i.e. such that the safety lever 126 is bi-stable. The safety lever biasing mechanism 154 helps ensure that the safety lever 126 is in the blocking or non-blocking position when stationary, making it clearer to an operator as to whether it is safe to egress from the cab 108. In alternative embodiments (not shown), the safety lever biasing mechanism 154 may be configured to bias the safety lever 126 towards only one of the blocking and non-blocking positions, or the first seat console assembly 120a may not include the safety lever biasing mechanism 154. In such embodiments, the first seat console assembly 120a may include a latch arrangement configured to selectively latch the safety lever 126 in one or both of the blocking and non-blocking positions, for example.

In the illustrated embodiment, the safety lever biasing mechanism 154 includes a biasing device in the form of a gas spring 155 connecting the safety lever 126 and the seat console body 124. The gas spring 155 is pivotally connected to the safety lever 126 at a pivot point 159 spaced from the first pivot point 134 (see FIG. 4). The gas spring 155 is pivotally connected to the seat console body 124 at a pivot point 167. The gas spring 155 is arranged such that when a relative angle between the safety lever 126 and the seat console body 124 is below a threshold, the safety lever 126 is biased towards the blocking position, and when said relative angle is above the threshold, the safety lever 126 is biased towards the non-blocking position. In alternative embodiments (not shown), the safety lever biasing mechanism 154 may include any suitable biasing means (e.g. any suitable spring such as a compression spring).

In the illustrated embodiment, when the seat console body 124 is in the operating position and the safety lever 126 is in the blocking position (shown in FIG. 5), movement of the seat console body 124 to the retracted position causes the linkage 130 to pivot the safety lever 126 relative to the seat console body 124 until the relative angle between the safety lever 126 and the seat console body 124 is greater than the threshold. Once said relative angle is greater than the threshold, the safety lever biasing mechanism 154 moves the safety lever 126 to the non-blocking position (shown in FIG. 6). As the safety lever 126 moves from the threshold to the non-blocking position under the action of the safety lever biasing mechanism 154, the driving force of the linkage 130 acting on the safety lever 126 diminishes to zero. Once the safety lever 126 is in the non-blocking position shown in FIG. 6, the second pivot point 136 is spaced from both ends of the track 138.

The first seat console assembly 120a includes an isolation system 150 configured to isolate the at least one control input member 116 mounted to the seat console body 124 when the safety lever 126 is in the non-blocking position so as to prevent the at least one control input member 116 from controlling the working machine 100. In the illustrated embodiment, the isolation system 150 isolates the first joystick 116a. Advantageously, the isolation system 150 helps to prevent an operator, who is attempting to egress from the cab 108, inadvertently operating the at least one control input member 116 when the safety lever 126 is in the non-blocking position. As such, the isolation system 150 helps to inhibit unwanted, and potentially hazardous, control of the working machine 100.

In the illustrated embodiment, the isolation system 150 includes a controller (not shown) and a sensor 152 configured to determine a relative angular displacement between the safety lever 126 and the seat console body 124. The sensor 152 may be any suitable rotary position sensor such as a rotary potentiometer-based sensor, for example. The isolation system 150 is configured such that the controller receives signals from the at least one control input member 116 and the sensor 152. The controller determines whether the safety lever 126 is in the blocking or non-blocking position based on the signal received from the sensor 152. When the controller determines that the safety lever 126 is in the blocking position, the controller is configured to allow signals received from the at least one control input member 116 to control the working machine 100 (e.g. via controlling one or more hydraulic actuators of the working machine 100). When the controller determines that the safety lever 126 is in the non-blocking position, the controller is configured to ignore signals received from the at least one control input member 116 so as to prevent said signals from controlling the working machine 100 (i.e. such that the at least one control input member 116 is isolated).

In alternative embodiments (not shown), the isolation system 150 may have any suitable configuration. For example, the isolation system 150 may include a switch configured to connect or disconnect the at least one control input member 116 to/from a control system of the working machine 100, where the switch is actuated according to the position of the safety lever 126.

The first seat console assembly 120a includes a seat console body biasing mechanism 156 configured to bias the seat console body 124 towards the retracted position. Advantageously, the seat console body biasing mechanism 156 reduces the effort needed by an operator to move the seat console body 124 from the operating to the retracted positions. In the illustrated embodiment, the seat console body biasing mechanism 156 includes a biasing means in the form of a gas spring 157 connecting the seat console body 124 and the seat console support 122. In alternative embodiments (not shown), the seat console body biasing mechanism 156 4 may include any suitable biasing means (e.g. any suitable spring such as a compression spring).

The first seat console assembly 120a includes a latching mechanism 158 configured to selectively latch the seat console body 124 to the seat console support 122 when the seat console body 124 is in the operating position. In the illustrated embodiment, the first seat console assembly 120a includes a release lever 160 protruding from an upper surface 162 of the seat console body 124. The release lever 160 is movable relative to the seat console body 124 between a latched position (shown in FIGS. 5 to 7) and an unlatched position (not shown). The latching mechanism 158 is operated via the release lever 160 to unlatch the seat console body 124 from the seat console support 122 when the release lever 160 is in the unlatched position. The latching mechanism 158 latches the seat console body 124 to the seat console support 122 when the seat console body 124 is in the operating position, and when the release lever 160 is in the latched position. By protruding the release lever 160 from the upper surface 162, the release lever 160 is in a more ergonomic position for operation by an operator seated in the seat 114.

In the illustrated embodiment, the release lever 160 pivots relative to the seat console body 124 about a pivot point 163 between the latched and unlatched positions. A release lever biasing mechanism 161 is configured to bias the release lever 160 towards the latched position. In the illustrated embodiment, the release lever biasing mechanism 161 is a compression spring connected to the release lever 160 and the seat console body 124, but may have any suitable configuration (e.g. may include a torsional spring about the pivot point 163). A pair of opposing stops 165 limit movement of the release lever 160 to between the latched and unlatched positions.

In the illustrated embodiment, the second seat console assembly 120b is fixed relative to the housing structure 112, and does not include the safety lever 126. In alternative embodiments (not shown), the second seat console assembly 120b may include one or more, or all, features of the first seat console assembly 120a. In such embodiments, the working machine 100 may include an additional exit passage extending between the seat 114 and an additional exit/entrance of the cab 108, where the second seat console assembly 120a is interposed between the seat 114 and said additional exit/entrance.

In alternative embodiments (not shown), the cab 108 may not include the second seat console assembly 120b. In such embodiments, the first seat console assembly 120*a* may have any suitable location within the cab 108.

In operation, when an operator of the working machine 100 enters the cab 108 so as to operate the working machine 100, the safety lever 126 is typically in the non-blocking position and the seat console body 124 is in the retracted position (as shown in FIG. 6). As such, the at least one control input member 116 is isolated, and the width of the exit passage 119 is maximized such that the operator can comfortably enter the cab 108 and reach the seat 114. Once seated in the seat 114, the operator moves the seat console body 124 to the operating position (as shown in FIG. 7), in which the latching mechanism 158 latches the seat console body 124 to the seat console support 122. Subsequently, the operator independently moves the safety lever 126 to the blocking position (as shown in FIG. 5). As such, the at least one control input member 116 can now control the working machine 100, and the exit passage 119 is blocked by the safety lever 126, which inhibits the operator egressing from the cab 108.

When the operator wishes to egress from the cab 108, the operator moves the release lever 160 from the latched to the unlatched position so as to unlatch the seat console body 124 from the seat console support 122. With the assistance of the seat console body biasing mechanism 156, the seat console body 124 is then moved to the retracted position. In response to the seat console body 124 being moved from the operating to the retracted position, the positioning mechanism 128 moves the safety lever 126 from the blocking to the non-blocking position (as shown in FIG. 6). As such, the at least one control input member 116 is now isolated, and the exit passage 119 is unblocked, allowing the operator to comfortably egress from the cab 108 via the exit passage 119.

In the illustrated embodiment, the operating and retracted positions are respectively lowered and raised positions of the seat console body 124 relative to the seat console support 122, and the seat console body 124 is pivotable relative to the seat console support 122 between the operating and retracted positions. In alternative embodiments (not shown), the seat console body 124 may translate relative to the seat console support 122 between the operating and retracted positions. In such embodiments, the seat console body 124 may not substantially change in height relative to the seat console support 122 between the operating and retracted positions. For example, it will be appreciated that the linkage 130 may be configured such that rearward translation of the seat console body 124 relative to the seat console support 122 from the operating position to a retracted position causes the second link 140 to pivot about the third pivot point 142 so as to move the safety lever 126 from the blocking to the non-blocking position in a similar manner as described above.

In the illustrated embodiment, the linkage 130 is configured such that the safety lever 126 is independently movable with respect to the seat console body 124 from the blocking to the non-blocking position and from the non-blocking to the blocking position. In alternative embodiments (not shown), linkage 130 may not be so configured. In such embodiments, the positioning mechanism 128 may instead include a separate mechanism to enable the safety lever 126 to be independently movable with respect to the seat console body 124. For example, the positioning mechanism 128 may include a coupling arrangement configured to selectively couple the safety lever 126 to the linkage 130, such that the safety lever 126 is independently movable with respect to the seat console body 124 when uncoupled from the linkage 130.

Although the teachings have been described above with reference to one or more preferred embodiments, it will be appreciated that various changes or modifications may be made without departing from the scope as defined in the appended claims.

The invention claimed is:

1. A seat console assembly for a working machine, comprising:
   a seat console support;
   a seat console body movably mounted to the seat console support and movable relative thereto between an operating position and a retracted position;
   a safety lever movably mounted to the seat console body and movable relative thereto between a blocking position and a non-blocking position for respectively blocking and unblocking an exit passage of the working machine when the seat console body is in the operating position; and
   a positioning mechanism comprising a linkage configured to move the safety lever from the blocking to the non-blocking position in response to the seat console body being moved from the operating to the retracted position,
   wherein the linkage comprises a first portion and a second portion, wherein the second portion drives the first portion in response to the seat console body being moved from the operating to the retracted position to move the safety lever from the blocking to the non-blocking position, wherein the first portion is independently movable with respect to the second portion such that the safety lever is independently movable with respect to the seat console body from the blocking to the non-blocking position and/or from the non-blocking to the blocking position, and
   wherein the first portion comprises a first link pivotally connected to the safety lever at a first pivot point, wherein the second portion is pivotally connected to the first portion at a second pivot point, wherein the first or second portion is configured such that the second pivot point is movable relative thereto, and wherein the second pivot point moves relative to said first or second portion when the safety lever is moved from the blocking to the non-blocking position and/or from the non-blocking to the blocking position, to allow the first portion to move independently of the second portion.

2. The seat console assembly of claim 1, wherein the linkage is configured to inhibit the safety lever moving from the non-blocking to the blocking position when the seat console body is in the retracted position.

3. The seat console assembly of claim 1, wherein the first portion is inhibited from moving relative to the second portion when the seat console body is in the retracted position, so as to inhibit the safety lever moving from the non-blocking to the blocking position.

4. A seat console assembly for a working machine, comprising:
   a seat console support;
   a seat console body movably mounted to the seat console support and movable relative thereto between an operating position and a retracted position;
   a safety lever movably mounted to the seat console body and movable relative thereto between a blocking position and a non-blocking position for respectively blocking and unblocking an exit passage of the working machine when the seat console body is in the operating position; and a positioning mechanism comprising a linkage configured to move the safety lever from the blocking to the non-blocking position in response to the seat console body being moved from the operating to the retracted position, wherein the linkage comprises a first portion and a second portion, wherein the second portion drives the first portion in response to the seat console body being moved from the operating to the retracted position to move the safety lever from the blocking to the non-blocking position, wherein the first portion is independently movable with respect to the second portion such that the safety lever is independently moveable with respect to the seat console body from the blocking to the non-blocking position and/or from the non-blocking to the blocking position, and wherein the first portion comprises a first link pivotally connected to the safety lever at a first pivot point, wherein the second portion is pivotally connected to the first portion at a second pivot point, wherein the second portion comprises a second link pivotally connected to the first portion at the second pivot point and to the seat console body at a third pivot point, wherein the second link pivots about the third pivot point so as to drive the first portion in response to the seat console body being moved from the operating to the retracted position.

5. The seat console assembly of claim 4, wherein the second portion comprises a third link pivotally connected to the second link at a fourth pivot point and to the seat console support at a fifth pivot point, wherein the third link drives the second link to pivot about the third pivot point in response to the seat console body being moved from the operating to the retracted position.

6. The seat console assembly of claim 1, wherein the positioning mechanism is configured to inhibit the safety lever moving from the non-blocking to the blocking position when the seat console body is in the retracted position.

7. A seat console assembly for a working machine, comprising:
a seat console support;
a seat console body movably mounted to the seat console support and movable relative thereto between an operating position and a retracted position;
a safety lever movably mounted to the seat console body and movable relative thereto between a blocking position and a non-blocking position for respectively blocking and unblocking an exit passage of the working machine when the seat console body is in the operating position; and
a positioning mechanism configured to move the safety lever from the blocking to the non-blocking position in response to the seat console body being moved from the operating to the retracted position,
wherein the positioning mechanism is configured such that the safety lever is independently movable with respect to the seat console body from the blocking to the non-blocking position and/or from the non-blocking to the blocking position, and
wherein the positioning mechanism comprises a bell crank pivotally mounted to the seat console body, wherein the positioning mechanism is configured such that the bell crank pivots relative to the seat console body in response to the seat console body being moved from the operating to the retracted position, and wherein said pivoting of the bell crank drives the safety lever to move from the blocking to the non-blocking position.

8. The seat console assembly of claim 1, further comprising: a control input member for controlling the working machine, the control input member mounted to the seat console body; and an isolation system configured to isolate the control input member when the safety lever is in the non-blocking position so as to prevent the control input member from controlling the working machine.

9. The seat console assembly of claim 1, further comprising a safety lever biasing mechanism configured to bias the safety lever towards the blocking and/or non-blocking positions.

10. The seat console assembly of claim 1, further comprising a seat console body biasing mechanism configured to bias the seat console body towards the retracted position.

11. The seat console assembly of claim 1, further comprising a latching mechanism configured to selectively latch the seat console body to the seat console support when the seat console body is in the operating position.

12. The seat console assembly of claim 1, wherein the operating and retracted positions are respective lowered and raised positions of the seat console body relative to the seat console support.

13. The seat console assembly of claim 1, wherein the seat console body is pivotable relative to the seat console support between the operating and retracted positions.

14. The seat console assembly of claim 1, wherein the safety lever is pivotable relative to the seat console body between the blocking and non-blocking positions.

15. The seat console of claim 1, wherein said first or second portion comprises a track along which the second pivot point is movable.

16. The seat console assembly of claim 7, wherein the bell crank is arranged so as to inhibit the safety lever moving from the non-blocking to the blocking position when the seat console body is in the retracted position.

17. The seat console assembly of claim 8, wherein the isolation system comprises a sensor configured to determine a relative angular displacement between the safety lever and the seat console body, and wherein the isolation system is configured to isolate the control input member when an output of the sensor indicates that the safety lever is in the non-blocking position.

18. The seat console assembly of claim 11, further comprising a release lever, wherein the latching mechanism is operated via the release lever to unlatch the seat console body from the seat console support, the release lever protruding from an upper surface of the seat console body.

19. The seat assembly of claim 13, wherein a pivot angle of the seat console body in the retracted position relative to the operating position is in the range of 20 to 40 degrees.

20. The seat assembly of claim 1, wherein the safety lever comprises a first lever end and a second lever end, wherein the safety lever is pivoted at a position between the first and second lever ends such that the second lever end forms a handle for actuating the safety lever.

* * * * *